United States Patent Office 3,251,916
Patented May 17, 1966

3,251,916
CELLULAR MATERIALS COMPRISING EXPANDED POLYSTYRENE AND POLYURETHANE BINDER
John Leathem Matthew Newnham, York, Peter Merriman, Birmingham, and Donald James Simcox, Sutton Coldfield, England, assignors to Dunlop Rubber Company Limited, London, England, a British company
No Drawing. Filed Dec. 20, 1962, Ser. No. 245,995
Claims priority, application Great Britain, Dec. 27, 1961, 46,242/61
5 Claims. (Cl. 264—128)

This invention relates to substantially rigid cellular materials, including substantially rigid cellular materials suitable for use in the in-situ preparation of mouldings and laminates for application to structural surfaces, for use as "crash padding" in vehicles and aircraft, and for protective packaging.

According to the present invention, a substantially rigid cellular material comprises bodies of an expanded polystyrene composition bonded together by means of a substantially non-cellular bonding agent.

The invention also includes a method of making a substantially rigid cellular material in which bodies of an expandable polystyrene composition are expanded and are subsequently bonded together by means of a substantially non-cellular bonding agent.

We prefer that the setting of the bonding agent used should be sufficiently slow to allow preferential accumulation of bonding agent at the points of contact of the expanded polystyrene composition bodies. This preferential accumulation is in our experience a desirable contribution to the strength of the finished product, especially if only a small proportion of bonding agent is used. Partly because they make possible the preferential accumulation just mentioned, and partly on account of other properties (referred to below), polyurethane bonding agents have shown themselves in our experience to be of outstanding value for bonding the polystyrene bodies.

Preferably, therefore, a substantially non-foaming liquid polyurethane-forming composition is used to afford the bonding agent. Such a liquid composition may suitably be derived from one or more organic compounds having at least two —NCX radicals in the molecule where X may in the case of each radical be an oxygen atom or a sulphur atom (e.g. a tolylene diisocyanate or a diphenylmethane diisocyanate or homologue thereof), and one or more organic chain compounds having at least two active-hydrogen-containing groups in the molecule; one or more catalysts (e.g. stannous octoate) and/or cross-linking agents may also be used to prepare the composition. The organic chain compounds just mentioned should be liquid or capable of giving liquid compositions with the other ingredients; some examples of suitable chemical types of organic chain compounds are polyether diols, triols and tetrols and sulphur analogues of those compounds, polyesters, polyesteramides, hydrocarbon polymers modified by the introduction of active-hydrogen-containing groups, and certain vegetable oils containing glycerides of hydroxy-acids (e.g. castor oil). The liquid polyurethane-forming composition may be formulated to contain a stoichiometric excess of —NCX radicals over the active-hydrogen-containing groups, and in this case it may if desired be caused or allowed to undergo a substantial degree of reaction before application to the expanded polystyrene composition bodies (provided that it still remains liquid), cross-linking and hardening by reaction with atmospheric moisture being allowed to take place after application. Instead, however, the liquid polyurethane-forming composition may be formulated to set and harden on its own, or by atmospheric oxidation; in those cases, there may in appropriate formulations be less than the stoichiometric proportion of —NCX radicals, and costs and toxic hazards can then be somewhat reduced (as well as dependence upon atmospheric humidity). Ratios of —NCX radicals to active hydrogen atoms which are in the neighborhood of 1:1 generally give particularly rapid setting of the bonding agent, though even with a large excess of isocyanate (e.g. with a ratio of 5:1) rapid setting can still be secured by the use of a catalyst.

Some examples of substantially non-cellular bonding agents which may be used, other than the polyurethane compositions, are drying oils, varnishes and rubber latex gels. If a rubber latex binder is used, it need not be derived from a natural rubber latex, but may for example comprise a terpolymer of butadiene, acrylonitrile and methacrylic acid. Some further examples of the non-polyurethane bonding agents which may be used are plaster (plaster of Paris) and hydraulic cement (e.g. Portland cement) with or without sand or other aggregate.

A combination of bonding agents, applied successively, may be used if desired (e.g. as described in Examples XVIII, XX, XXII, XXIV and XXV below). Thus a material pre-bonded with a polyurethane bonding agent may be subsequently treated with a latex binder, with a liquid mixture comprising plaster and water or comprising a hydraulic cement and water, with a liquid polyurethane rubber, or with another secondary bonding agent.

The bodies of an expanded polystrene composition may suitably be derived from bodies of a thermally-expandable polystyrene composition containing (in addition to polystyrene) a volatile liquid such as a mixture of pentanes, for example; the latter bodies may suitably be heated to 100° C., or a temperature of that order, to effect expansion. Generally it is convenient to use expanded polystyrene composition bodies with diameters of 0.1 mm. to 10 mm. or more. The expanded polystyrene composition bodies may be of any of a wide variety of shapes, and may thus be of an elongated shape or even of a fibrillar form. The ratio by weight of the expanded bodies to the bonding agent is normally within the range 7:1 to 1:10 (respectively) but is preferably within the range 3:1 to 1:5 (respectively); as the ratio just specified decreases, the strength and also the density of the product naturally increase, as does the drainage of excess bonding agent to the supporting surface (such drainage being useful when a particularly strong bond to a substrate is required). The expanded polystyrene composition bodies may generally be intimately stirred with the bonding agent in any suitable type of mixer, from which is should be transferred to the mould, cavity, surface or the like for which it is intended, well before any substantial setting and hardening of the bonding agent has taken place. The time required for setting and hardening may vary, even with the preferred polyurethane compositions, from a few minutes to several hours, according to the formulation of the bonding agent and its temperature.

When the liquid polyurethane-forming composition is used as the bonding agent, the expanded polystyrene composition bodies may if desired be moistened beforehand with water (assuming it is one of the ingredients), or treated beforehand with some other ingredient, with a view to obtaining quicker bonding. In this case, however, any carbon dioxide evolved by the reaction of —NCO radicals with water must be able to diffuse away without producing gas bubbles within the polyurethane component.

Cellular materials according to the present invention are relatively cheap (generally cheaper than rigid polyurethane foam, for instance), and even when more expensive than plain cellular polystyrene have the advantage over that material of being conveniently formed in situ or moulded in complicated shapes. Also, shaped bodies of the cellular materials of the present invention can be made from mixtures which are at ordinary temperatures when applied and which need not be heated to effect setting and hardening. Plain expanded polystyrene moulded by steam heating or dielectric heating, in contrast, is liable to suffer from such disadvantages as difficulty of density control, slow production and high equipment costs in the case of mouldings, and heat-application difficulties in the case of in-situ operations. The bonding agents of the cellular materials of the invention can readily be formulated for bonding to (e.g.) wood or aluminum if desired, although if on the other hand, bonding to adjacent surfaces is to be avoided, these surfaces may be treated with a releasing agent, for example, or made of a non-adhering material (e.g. a polypropylene-wax composition) in the case of moulds.

As already stated, polyurethane bonding agents are strongly preferred, and the following advantages can be secured by the selection of these agents for the present purpose:

(1) The low viscosity (without any need to heat) enables rapid, easy mixing with the polystyrene bodies.
(2) The low viscosity, and the absence of any rapid setting by cooling, evaporation of solvent, or chemical action, gives ample time for accumulation of binder at the contact points under the ordinary capillary forces. Only later does the chemical setting occur.
(3) No solvent is present to become trapped in laminates or to give a fume or fire risk.
(4) Long pot life can be secured if desired by the omission of catalyst.
(5) There is no need to use heat to cure.
(6) Binder films are formed which possess considerable elasticity, so that the finished product is sufficiently flexible to allow large, thin sheets of it to be rolled up and unrolled.
(7) The coating is waterproof. The product is undamaged by prolonged immersion in water or sea water, and after a small initial drop its buoyancy remains substantially constant.

The following examples illustrate the invention. All the "parts" given in the examples are parts by weight, unless otherwise stated.

Example I 100 parts of a polyether tetrol obtained by a process in which polypropylene oxide chains were "grown" on ethylene diamine and then "tipped" with ethylene oxide, sold under the trade name "Tetronic 701," were stirred for 2 hours with 28 parts of an 80/20 mixture of 2:4- and 2:6-tolylene diisocyanate. After the 2 hours the mixture had substantially regained room temperature after an exothermic reaction. 1.3 parts of stannous octoate catalyst were then stirred in for 2 minutes.

2 parts of the above liquid were next intimately mixed with 1 part of beads which had been prepared by expanding inflatable polystyrene particles of approx. 0.2 to 0.6 mm. diameter by heating them for 15 minutes at 100° C. in steam at atmospheric pressure and then air-drying them. This mixing operation occupied about 5 minutes and the product consisted of slightly coherent, tacky crumbs.

A charge of this freshly-made crumb material was then transferred to the cavity between two parallel rectangular sheets of ply-wood spaced 1" apart and sealed round three edges by wooden strips 1" wide. As the loose material fell into the space it was gently compacted by means of a ⅞" square-section rod. When complete, the filling was smoothed along the open edge with a trowel and the assembly left undisturbed in a vertical position to set for six hours, by which time the filling had hardened. The resulting laminate was then sawn up into several pieces by means of a bandsaw. It was noted that the freshly-cut edges of the filling were firm and dry, with no tendency to crumble. Hand-sawing and drilling were likewise successful. The ply-wood was quite firmly bonded to the foam, and the laminate resisted impacts and compressive loads well, and possessed sound-deadening properties. The density of the foam filling was approximately 0.05 gram/cubic centimetre.

The procedure followed in the Examples II to VIII set out below generally corresponded with that of Example I except where different measures are explicitly described.

Example II

The procedure for Example I was repeated but using 42.5 parts of a mixture of 3 parts of 4:4'-diphenylmethane diisocyanate and 2 parts of 3:3'-dimethyldiphenylmethane-4:4'-diisocyanate sold under the trade name "Suprasec M" in place of the tolyene diisocyanate, and using 1.4 parts instead of 1.3 parts of stannous octoate.

The freshly made crumb material was slightly more tacky than that of Example I but could be handled in the same manner.

The laminate had set in four hours, and showed similar satisfactory properties. The density of the foam filling was approximately 0.05.

Example III

The procedure of Example I was repeated except that the polyether tetrol was replaced by 100 parts of a polypropylene glycol triol sold under the trade name "Voranol CP3000" and the stannous octoate was increased to 2.6 parts.

The freshly mixed crumb material was only very slightly coherent and tacky, and the laminate required 24 hours to harden off but was then similar in properties to the laminates of the previous examples. The density was about 0.045.

Example IV 100 parts of the polyether tetrol "Tetronic 701" and 48 parts of the 80/20 tolylene diisocyanate were reacted as in Example I, and 3 parts of stannous octoate added.

1 part of the resulting liquid was mixed for 15 minutes with 3 parts of the polystyrene beads. The product was a very loose crumb material.

A rectangular polypropylene mould was filled with the crumb material, and an inside-fitting polypropylene lid was applied and loaded to give a pressure of 5 lb./sq. ft. Although the lid was free to move down this did not cause more than a slight degree of further compacting. After standing for 6 hours the foam had set and was lifted out of the mould. Its density was 0.022. It was rather easily abraded but showed considerable compressive strength.

Example V 100 parts of the polypropylene glycol triol sold under the trade name "Voranol CP3000" were stirred for 2 hours with 42.5 parts of the mixed diisocyanates used in Example II ("Suprasec M"), and 1.4 parts of stannous octoate were then stirred in.

2 parts of the liquid so obtained were well mixed with 1 part of the beads for 5 minutes. The product was a slightly coherent, tacky crumb material.

A laminate made as in Example I hardened in 2 hours, and bonding to the ply-wood was good. The foam density was 0.05.

Example VI

A binder was prepared from 100 parts of the polypropylene glycol triol sold under the trade name "Voranol CP3000," 10.3 parts of 80/20 tolylene diisocyanate, and 0.5 part of stannous octoate. This was stirred for 1 hour and then used promptly, delay being avoided in case gelation occurred, the NCO/OH ratio being rather near to 1:1.

The ratio of binder to beads was 2:1, and mixing was for 5 minutes. The resulting crumb material was slightly coherent and tacky and handled particularly well. The isocyanate fumes were less noticeable than in Examples I, II, and IV.

The laminate set in under 4 hours and had satisfactory properties. The foam density was 0.04.

Example VII

A binder was prepared from 100 parts of the polypropylene glycol triol sold under the trade name "Voranol CP3000," 20 parts of a liquid grade of diphenylmethane diisocyanate sold under the trade name "Suprasec D," and 0.30 part of stannous octoate. It was stirred for 1 hour and then used promptly.

The ratio of binder to beads was 2:1 and mixing time was 5 minutes.

The resulting crumb material was slightly coherent and tacky. The isocyanate fumes were very slight.

The laminate set after several hours. The product was brownish in colour but otherwise had normal properties. Its density was 0.05.

Example VIII

The binder in this case had to be prepared with prewarmed ingredients because the isocyanate was solid at room temperature. 100 parts of the polypropylene glycol triol sold under the trade name "Voranol CP3000" at 40° C. were stirred for 1 hour with 13.6 parts of pure diphenylmethane diisocyanate at 40° C. and then left to cool for half-an-hour. Then 0.30 part of stannous octoate was stirred in for 2 hours and the product used forthwith.

The ratio of binder to beads was 2:1 and the mixing time was 5 minutes. The resulting crumb material was slightly coherent and tacky. The isocyanate fumes were very slight.

The laminate set after several hours and had normal properties. The density of the foam was 0.047.

Example IX

One part of the same binder as that used in Example VII was mixed in the usual manner with one part of polystyrene beads which had been prepared by expanding particles of 0.5 to 2 mm. diameter to a density of 0.008 by the following two-step method. First they were heated in a tray in steam at atmospheric pressure for 15 minutes. Then they were allowed to cool for 15 minutes and dried in an air oven at 50° C. for 24 hours. At this stage the product consisted of beads of bulk density 0.024. This was allowed to stand for 24 hours. Next the beads were further expanded by repeating the steam heating, cooling and drying. The product now consisted of beads of bulk density 0.008.

The mixing operation occupied about five minutes, and gave a slightly coherent tacky crumb material of coarser texture but similar working properties to those prepared in the earlier examples. It was employed in several different ways.

One portion was cast into a block of density 0.016 by trowelling it into a sheet iron tray lined with polypropylene foil, and closing this with a loose fitting polypropylene lid loaded to give a pressure of 5 lb./sq. ft.

Another portion was converted into a plywood laminate by the technique described in Example I but with the plywood sheets spaced 2½" apart. The foam filling had a density of approximately 0.018 and was uniformly distributed and adhered to the plywood.

A third portion was mechanically filled into a similar cavity between plywood sheets, and gave a similar product to the handfilled one. This was done by gravity feeding the crumb material from 1 ft. deep, steep-sided hopper on to a moving rubber conveyor belt spaced 1 inch below the opening of the hopper. The layer of crumb material thus deposited on to the belt was doctored to approximately ¾" thickness by means of a steel bar, and at the end of the conveyor it was caused to fall off vertically into the cavity by means of a scraper blade. During filling the crumb material was tamped down gently.

Example X

The procedure of Example IX was repeated except that one part of the expanded beads was mixed with 0.5 part of the binder. In this case of the moulded block the density was 0.014. In the case of the plywood laminate the density was 0.012. Adhesion to the plywood was only slight.

Example XI

A binder was firse prepared by the following method.

100 parts of polypropylene glycol diol having a molecular weight of 2000 was mixed with 0.025 part of stannous octoate by stirring for 2 minutes. Then 15.2 parts (about 1.75 equivalents) of an 80/20 mixture of 2,4- and 2,6-tolylene diisocyanate was stirred in for 1 hour under an atmosphere of dry nitrogen. The exothermic reaction raised the temperature to about 52° C. At the end of the hour the batch was cooled to room temperature. At this stage the prepolymer was a liquid of moderate viscosity in which very little of the tolylene diisocyanate remained unreacted.

Next, 9 parts of a liquid grade of 4,4'-diphenylmethane diisocyanate sold under the trade name Suprasec D were stirred in for 5 minutes. This gave an immediate viscosity increase. The batch was then matured overnight in a closed vessel; only a slight further increase in viscosity occurred, and on further storage viscosity "drift" was very low or negligible. The matured liquid was free from isocyanate fumes.

One part of stannous octoate was stirred for two minutes into 100 parts of the binder prepared as just described.

1.5 parts of this mixture was immediately mixed with 1.0 part of twice-expanded polystyrene beads of bulk density .008 gm./cubic centimeter prepared as described in Example IX. Mixing was continued for five minutes, the tacky crumb then being transferred to a mould of size 24" x 24" x 1" and left several hours to set under a small compression load.

The product was of density 0.026 gram/cubic centimeter.

Example XII

A binder was prepared from 100 parts of rubber contained in centrifuged concentrated natural latex and 0.75 part of potassium oleate. Before adding this latex binder to the twice-expanded polystyrene beads, prepared as described in Example IX and of bulk density 0.01025 gram/cubic centimeter, 3.0 parts of sodium silicofluoride were added to the latex and intimately mixed with it for one minute, all these parts being by dry weight.

2.5 parts of this latex binder were added to 1.0 part of twice-expanded polystyrene beads, prepared as described in Example IX, the two being intimately mixed, in a mixer fitted with a stirrer which described planetary motion, for three minutes. A charge was transferred to a metal mould which had previously been lined with thin polyethylene sheet. The mould lid was placed on the mould and slight pressure was applied. The latex set to a solid gel in eight minutes. The product was firmly bonded and had a density of 0.021 gram/cubic centimeter.

Example XIII

In this case a latex binder was used which consisted only of a terpolymer of butadiene, acrylonitrile, and methacrylic acid, no soap or setting agent being added.

1.0 part of binder was intimately mixed with 1.0 part of twice-expanded polystyrene beads, prepared as described in Example XI, in a mixer fitted with a stirrer with planetary motion. A charge was transferred to a polyethylene-lined metal mould. The mould lid was added to the mould and slight pressure applied to the lid. The moulded product was allowed to dry for 48 hours. The sample had a density of 0.021 gram/cubic centimeter.

Example XIV

A natural latex binder was prepared according to the following formulation: 100 parts of rubber contained in centrifuged concentrated natural latex; 2.0 parts of potassium oleate; 0.5 parts of zinc diethyl-dithiocarbamate; 1.5 parts of zinc mercaptobenzthiazole; and 0.5 parts of N,N'-di-beta- naphthyl para-phenylene diamine. Before mixing this latex binder with the polystyrene beads, which were prepared according to the method which is described in Example IX, 3.0 parts of zinc oxide and 6.0 parts of sodium silicofluoride were added to the latex and mixed intimately with it for one minute, all these parts being by dry weight.

2.5 parts of the above binder, were mixed intimately, using a mixer fitted with a stirrer which described planetary motion, with 1.0 part of the expanded polystyrene beads for three minutes. A charge was transferred to a polyethylene-lined metal mould. The mould lid was then added, a slight pressure being applied. The latex set to a solid gel in about ten minutes. After standing for another ten minutes the sample was cured in steam at 100° C. for 30 minutes. The sample was rigid and showed no tendency to crumble, its density being 0.029 gram/cubic centimeter.

Example XV

The procedure and the binder used were as described in Example XIV, except in that 1.5 parts of binder were used for every 1.0 part of beads. The product was firmly bonded and had an approximate density of 0.022 gram/cubic centimeter.

Example XVI

The procedure and the binder used were as described in Example XIV, except in that 1.0 part of binder were used for every 1.0 part of beads. The product was firmly bonded and showed no tendency to crumble, the density being approximately 0.0182 gram/cubic centimeter.

Example XVII

The binder used was as described in Example XIV. 35.5 parts of the binder were poured into a mould which contained 1.0 part of twice-expanded polystyrene beads, prepared as described in Example IX. The open side of the mould was covered by a porous cotton material which prevented the beads from floating out of the mould as the latex binder was added. The mould lid was placed on the mould. The latex set to a solid gel after about 12 minutes. The product was allowed to stand for a further ten minutes. It was then cured in steam at 100° C. for 30 minutes. The product was rigid and had a density of 0.276 gram/cubic centimeter.

Example XVIII

A slab of bonded polystyrene beads was prepared according to Example XI, and placed in a metal mould.

Enough latex binder, prepared as described in Example XIV, was added to fill the mould completely, 33 parts of latex binder being used for every 1.0 part of beads. The mould lid was placed on the mould. The latex binder set to a solid gel in about ten minutes. After standing for another ten minutes, the sample was cured in steam at 100° C. for 30 minutes. The sample was rigid, and on sawing it could be seen that the latex had penetrated through the pre-bonded sample. The sample was rigid and had a density of 0.217 gram/cubic centimeter.

Example XIX

A latex binder was prepared according to the following formulation: 100 parts of rubber contained in centrifuged concentrated natural latex; 1.5 parts of casein; 2.0 parts of potassium oleate; 0.5 part of potassium hydroxide; 2.0 parts of sulphur; 1.0 part zinc diethyl-dithiocarbamate; 0.5 part of zinc mercaptobenzthiazole; 3.0 parts of zinc oxide; 0.5 part of N,N'-di-beta-naphthyl para-phenylene diamine; and 350 parts of whiting. This compounded latex was left to mature for approximately 24 hours at room temperature. Before adding this latex binder to the polystyrene beads, the preparation of which is described in Example IX, 23.0 parts of sodium silicofluoride were added to the latex and mixed intimately with it for one minute, all the above parts being by dry weight.

The mixing and mould technique were as described in Example XVII, except in that 93 parts of binder were used for every one part of twice-expanded polystyrene beads, the preparation of which is described in Example IX. The product was very hard and showed no tendency to crumble, the density being 0.33 gram/cubic centimeter.

Example XX

The latex binder used was as described in Example XIX. The moulding technique and details were as described in Example XVIII except in that 71.0 parts of binder were used for every 1.0 part of twice-expanded polystyrene beads, prepared as described in Example IX. The product was hard and showed no tendency to crumble; on sawing, it could be seen that the latex had penetrated through the pre-bonded sample. The product density was 0.36 gram/cubic centimeter.

Example XXI

One part of plaster was mixed with sufficient water to form a paste. 1 part of twice-expanded polystyrene beads, prepared as described in Example IX, was mixed intimately with the paste, all these parts being by volume. A charge was transferred to a mould where it was allowed to dry for approximately 72 hours. The product, a rigid brick, had a density of 0.670 gram/cubic centimeter. A similar brick prepared from plaster and water only, for the purpose of comparison, was found to have a density of 1.37 grams/cubic centimeter.

Example XXII

Polyurethane-bonded polystyrene, prepared as described in Example XI, was placed in a mould. Sufficient water was added to plaster to form a homogeneous liquid of low viscosity. This liquid was then poured over the pre-bonded polystyrene. The product was allowed to dry for approximately 72 hours. The product was rigid, and on sawing it could be seen that the plaster liquid had penetrated through the polyurethane-bonded sample. The product had a density of 0.333 gram/cubic centimeter.

Example XXIII 3 parts by volume of sand were mixed with 1 part by volume of Portland cement. Sufficient water was added to form a paste. 4 parts by volume of twice-expanded polystyrene beads, prepared as described in Example IX, were mixed intimately with this paste. A charge was transferred to a mould which was then allowed to dry for approximately 72 hours. The product was rigid and had a density of 0.917 gram/cubic centimeter. A similar product prepared without the polystyrene beads had a density of 1.78 grams/cubic centimeter.

Example XXIV

Polyurethane-bonded polystyrene, prepared as described in Example XI, was placed in a mould. Sufficient water was added to 3 parts by volume of sand and 1 part by volume of Portland cement to make a homogenous pourable liquid of low viscosity. This liquid was poured over the pre-bonded polystyrene. The mould and contents were allowed to dry for approximately 72 hours. The product was rigid and on sawing it could be seen that the cement solution had penetrated through the polyurethane-bonded polystyrene. The product had a density of 0.468 gram/cubic centimeter.

Example XXV 100 parts by weight of the liquid polyurethane rubber sold under the trade name "Adiprene L.D. 167" were warmed to 70° C., and 6 parts of melted trimethylolpropane stirred in for 5 minutes under vacuum. The mixture was then cooled to 40° C., at which temperature it was a viscous liquid. It was poured into an open rectangular mould, and a previously prepared rectangular slab of polyurethane-bonded polystyrene bead material made as described in Example XI, and making a close fit within the mould, was gradually submerged in the liquid, which filled the whole of the interstices and left a thin layer of excess liquid.

The mould and its contents were then left to stand at room temperature for one week by which time the liquid had cured to a strong rubber. The mould was stripped and the product consisted of a slab of tough resilient material having an overall density of 0.485 gram/cubic centimeter, inclusive of the thin layer of surplus polyurethane rubber on one surface.

Example XXVI 100 parts by volume of twice-expanded polystyrene beads prepared as described in Example IX were placed in an open rectangular mould and 45 parts of the liquid polyurethane rubber "Adiprene L.D. 167" gently stirred in. A flat metal plate was lowered on to the top surface thereby compressing the mixture to the dimensions of the mould. On standing a small amount of entrapped air rose to the surface.

The mould and contents were left to stand for one week. The product then extracted was a slab of tough resilient material having a slightly irregular top surface where the escaped air had been trapped.

The density of the sample was 0.465 gram/cubic centimeter.

Having now described our invention—what we claim is:

1. A method of making a substantially rigid, cellular, material which comprises assembling bodies of an expanded polystyrene composition tangentially into point contact, bringing into contact with the assembled bodies an amount insufficient to fill the voids in said assembly of a substantially non-foaming liquid polyurethane-forming composition which sets at a rate sufficiently slow to allow its preferential accumulation at the points of contact with the expanded bodies, maintaining said contacting expanded bodies and polyurethane-forming composition in said assembly until the setting of the said polyurethane-forming composition has taken place and applying at least one second bonding agent of the class consisting of a rubber latex, a liquid polyurethane rubber, a plaster and water and a hydraulic-cement and water to the bonded assembly after the setting of the polyurethane composition and maintaining said secondary bonding agent in association with said bonded assembly until said second bonding agent has set.

2. The method of claim 1 in which said secondary bonding agent is a latex binder.

3. The method of claim 1 in which said secondary bonding agent is a liquid mixture comprising plaster and water.

4. The method of claim 1 in which said secondary bonding agent is hydraulic-cement and water.

5. The method of claim 1 in which said secondary bonding agent is liquid polyurethane rubber.

References Cited by the Examiner

UNITED STATES PATENTS

| | | |
|---|---|---|
| 2,744,291 | 5/1956 | Stastny et al. |
| 2,806,509 | 9/1957 | Bozzacco et al. _____ 260—2.5 |
| 2,861,895 | 11/1958 | Hardman _____ 260—2.5 |
| 2,958,905 | 11/1960 | Newberg et al. ____ 260—2.5 XR |
| 2,972,559 | 2/1961 | Allen et al. |
| 3,010,157 | 11/1961 | Cizek _____ 260—2.5 |
| 3,021,291 | 2/1962 | Thiessen _____ 260—2.5 |
| 3,047,540 | 7/1962 | Merten et al. _____ 260—77.5 |
| 3,062,682 | 11/1962 | Morgan et al. ____ 260—2.5 XR |

LEON J. BERCOVITZ, *Primary Examiner.*

EARL M. BERGERT, *Examiner.*

M. SUSSMAN, J. J. KLOCKO, *Assistant Examiners.*